(No Model.)

J. J. GRAHAM.
Nut Lock.

No. 239,381.                Patented March 29, 1881.

Attest.
Charles Pickles
G. D. Knight

Inventor,
John J. Graham
By Knight Bros.
Attys

UNITED STATES PATENT OFFICE.

JOHN J. GRAHAM, OF MOUNT VERNON, ILLINOIS.

NUT-LOCK.

SPECIFICATION forming part of Letters Patent No. 239,381, dated March 29, 1881.

Application filed September 3, 1880. (No model.)

*To all whom it may concern:*

Be it known that I, JOHN J. GRAHAM, of Mount Vernon, in the county of Jefferson and State of Illinois, have invented a certain new and useful Improvement in Nut-Locks, of which the following is a full, clear, and exact description, reference being had to the accompanying drawings, making part of this specification.

My invention relates to those devices in which a plate is employed for the purpose of locking the nuts on the bolts. My improvement consists in forming the plate with an upwardly-projecting tongue having a re-enforce fold, said tongue being adapted to be turned down between the nuts, so as to secure the latter by means of the re-enforce fold. The plate is intended more especially for locking the nuts upon rail-joints of railways, but may be used for other locking purposes.

Figure 1:
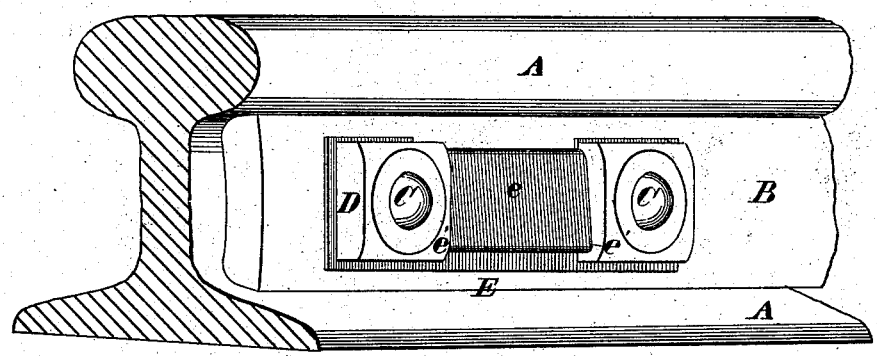
Figure 2:
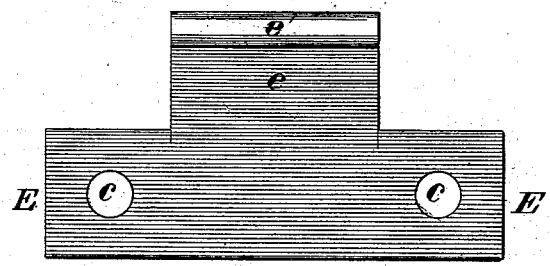
Figure 3:
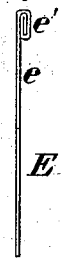
Figure 4:
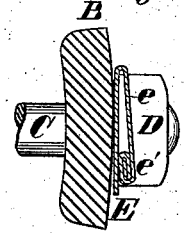

In the drawings, Figure 1 is a perspective view. Fig. 2 is a face view of the lock-plate before its attachment. Fig. 3 is an edge view of the same. Fig. 4 shows the fish-plate and lock-plate in transverse section and the nut and a part of one of the bolts in side view.

My invention is shown as applied to a rail-joint.

A is a portion of a rail, and B is a part of a fish-plate.

C C are fish-plate bolts, and D D are nuts upon the same.

E is the lock-plate, having two bolt-holes, c c, and a tongue, e, whose width is about the same as the distance of the proximate sides of the nuts asunder, so that when the nuts are in a position parallel with each other, as shown in Fig. 1, the tongue may be turned down between them, and, by the contact of its edges with the sides of the nuts, prevent their turning upon the bolts. The ordinary fish-plate bolt is so formed at the head as to prevent its turning in the plate.

The edge $e'$ of the tongue is folded over upon itself or upon a stiffener, such as a wire or strip, to increase its strength and bearing against the sides of the nut and prevent buckling. With this re-enforce thin sheet metal may be used in the construction of the lock-plate, for it will be seen that there is but little strain upon any part but the tongue, and that the re-enforce $e'$ will make the tongue abundantly strong. It will also render the tongue so thick that it cannot enter beneath the nuts, and so become inefficient for the purpose designed.

It will be understood that the plate E is placed upon the bolts C C and the nut screwed down upon it, so as to leave the nuts parallel, as shown. Then the tongue $e$ is bent down between them, (the nuts,) and prevents their unscrewing.

I claim herein as of my invention—

The nut-lock plate E, having bolt-holes $c\ c$, and a tongue, $e$, formed with a re-enforce fold, $e'$, the said tongue being adapted to turn down between the nuts, as shown and described.

JOHN J. GRAHAM.

Witnesses:
JAMES M. POLLOCK,
WM. C. POLLOCK.